_3,109,014_
METHOD FOR PREPARING MONOMETHYL-DICHLOROSILANE
Kihachi Tamura, Tokyo, Yoshio Yoshikawa, Zenkoji-hama, Naoetsu-shi, and Ichiro Ito and Minoru Taka-mizawa, Annaka-shi, Japan, assignors to Shin-Etsu Chemical Industry Co., Ltd., Tokyo, Japan, a corporation of Japan
No Drawing. Filed Jan. 4, 1961, Ser. No. 80,522
6 Claims. (Cl. 260—448.2)

This invention relates to a method of preparing monomethyldichlorosilane, and more particularly it relates to a method of passing a mixture gas of methyl chloride and hydrogen chloride on a contact mass comprising silicon, copper and silver and reacting the same at a temperature of 250° to 350° C.

Heretofore it has already been well known from U.S. Patent No. 2,588,367 that monomethyldichlorosilane is very useful for the manufacture of water-repellent silicone fluid and of so-called carbon functional silanes. At present, however, its yield is low because of the fact that it is produced as a by-product in Rochow's direct method (U.S. Patent No. 2,380,995) of methyl silanes, and on the other hand Grignard and other methods cannot entirely be employed commercially due to much lower yield. Methyl silane synthesis, familiar to us, by direct reaction of a silicon-copper contact mass and methyl chloride now employed serves only to provide dimethyldichlorosilane which is the most useful for various silicones, so that the amount of monomethyldichlorosilane by-produced may be as small as 1 to 2% of the total amount of the product. When this reaction is effected at an elevated temperature such as above 350° C., the yield of the monomethyldichlorosilane by-produced may be increased to as high as 10%. In the latter case, however, the yield of the dimethyldichlorosilane will considerably be lowered thereby to cause remarkable disadvantages from commercial point of view. Further, satisfactory results have not yet been obtained commercially from the known methods carried out to provide the monomethyldichlorosilane wherein hydrogen gas is introduced. U.S. Patents Nos. 2,483,373 and 2,488,487 teach the use of hydrogen chloride in direct synthesis of the methylchlorosilane, but in former patent nothing is mentioned about the production of the monomethyldichlorosilane. The above mentioned U.S. Patent No. 2,488,487 discloses monomethyldichlorosilane as one of principal products but it cannot be said to solve the drawbacks in industry, since yield of dimethyldichlorosilane having greater commercial values is extremely low whilst that of methyltrichlorosilane which is little useful is very high. The employment of the copper-silver catalyst in such silane synthetic reaction is shown, for example, U.S. Patent No. 2,380,995, but it has nothing to do with the production of monomethyldichlorosilane.

According to the present invention, it makes it possible to produce monomethyldichlorosilane in commercial scale, by contacting a gaseous mixture of hydrogen chloride and methylchloride with a contact mass comprising silicon, silver and copper at 250°–350° C. and distilling the reaction product. We have found that reaction of silicon and methyl chloride gas containing hydrogen chloride in the presence of a copper-silver catalyst produces monomethyldichlorosilane in considerably higher yield without damaging the yield of dimethyldichlorosilane so much. It is an object of the present invention to provide a method to produce the desired monomethyldichlorosilane in remarkably increased yield that is, with above 20% in any event, and up to as high as 38%, while maintaining the yield of dimethyldichlorosilane as high as 25%.

There is no limit with respect to molar ratio of methyl chloride to hydrogen chloride in the feed gas, but generally, 3:1 to 0.5:1, preferably 2.5:1 to 1.4:1, is used. An inert gas such as for example, nitrogen, hydrogen, argon, helium gas may be fed together with said feed in order to discharge as soon as possible the object product out of the reaction system kept at the decomposition temperature, but this addition is not specifically necessary.

In the present invention it is clear that hydrogen chloride used with methyl chloride is a hydrogen source necessary for the synthesis of monomethyldichlorosilane, and reaction mechanism of the catalyst is supposed, although not sure, that the silver ingredient in this catalyst not only makes reaction velocity between methyl chloride and silicon and that between hydrogen chloride and silicon in the said reaction system approximately the same, but also prevents from secondary decomposition of produced hydrogen-containing silanes such as monomethyldichlorosilane to insure maintenance of the hydrogen atom.

The silver ingredient in the present catalyst should be in the form of copper-silver, otherwise, the desired silane cannot satisfactorily be produced. If silver is used alone as the catalyst, there is produced no silanes even after a reaction of silicon and methyl chloride at an elevated temperature such as 400° C. Contamination of the present catalyst with the other metals such as iron, tin, antimony, magnesium, zinc, aluminum etc. excluding silicon, results in accelerating the secondary decomposition of the produced hydrogen-containing silanes such as monomethyldichlorosilane thereby to remarkably reduce the yield of the object compound.

The amount of silver contained in the present copper-silver catalyst should be within the range of 3 to 50% by weight, preferably 5 to 25%. The present catalyst may be in the form of either copper-silver alloy or mixture of copper and silver, but the alloy is better in the light of the fact that silver, which is expensive, can effectively work and that the preparation is easy. When it is used in the form of mixture, it is desirable to mix water solution of silver salts such as, for example, silver nitrate with powders of metallic copper and then coat metallic silver on the copper powders by ion exchange. The above catalyst may be alloyed or mixed with metallic silicon, one of reactants, to form a contact mass. When mixture is formed, the ingredients may be mixed in a ball-mill. The amount of the catalytic components in the contact mass may be 5 to 15% by weight, preferably 8 to 12%.

The reaction is carried out at 250°–350° C. The reaction velocity is rapidly lowered at less than 250° C., while at more than 350° C. the decompositions of monomethyldichlorosilane produced as well as of methyl group are significant, with the results that the yield of monomethyldichlorosilane is reduced, the yield of monomethyltrichlorosilane is increased and the catalytic activity rapidly decreases.

The present invention is further illustrated by the following specific examples comparing with the prior art. In the examples "Me" indicates methyl radical, percent and part are referred to by weight, otherwise specifically indicated.

*Example 1*

This example, showing practice under conditions outside the scope of the invention, is presented for purpose of illustrating results obtained when silver, required as a catalyst in the process of the invention, is omitted.

Nine parts of silicon powder and one part of copper foil powder were intimately mixed in a ball mill and packed in a quartz reaction tube of 4.5 cm. in diameter and 100 cm. long. A mixture gas of methyl chloride and dry hydrogen chloride in a molar ratio of 1.5:1 was passed at a rate of 20 liters/hr./kg. (contact mass) through the tube at a temperature of 300° C.

The gases issuing from the reactor were condensed by cooling the same to −70° C. Subsequent fractional distillation of the condensate gave the following analysis.

|  | Percent |
|---|---|
| $HSiCl_3$ | 10.2 |
| $MeSiHCl_2$ | 11.2 |
| $SiCl_4$ | 4.0 |
| $Me_2SiCl_2$ | 23.6 |
| $MeSiCl_3$ | 35.1 |

*Example 2*

This example, showing practice under conditions outside the scope of the invention, is presented for purpose of illustrating results obtained when the copper, required at catalyst in the process of the invention, is omitted.

The procedures of the preceding example were repeated except that silver foil powder was employed instead of the copper foil powder, and the reaction was effected at a temperature up to 400° C. with gradual increasing. A space velocity in a reaction tube was 8 liters/hr./kg. No condensation liquid was obtained.

*Example 3*

One part of a substance containing 19% of silver, said substance being obtained by immersing 1 part of copper foil powder in an aqueous solution containing 0.35 part of silver nitrate to coat silver on the surfaces thereof, was mixed with 9 parts of silicon powder and packed in a quartz tube of 4.5 cm. in diameter and 100 cm. long. Onto this a mixture gas of methyl chloride and dry hydrogen chloride in a molar ratio of 1.5:1 was passed at 290°–300° C. at a rate of 18 liters/hr./kg.

The gases issuing from the reactor were condensed by cooling the same to −70° C. Subesquent fractional distillation of the condensate gave the following analysis.

|  | Percent |
|---|---|
| $HSiCl_3$ | 7.5 |
| $MeSiHCl_2$ | 30.5 |
| $SiCl_4$ | 5.3 |
| $Me_2SiCl_2$ | 25.0 |
| $MeSiCl_3$ | 20.7 |

*Example 4*

The procedures of the preceding Example 3 were repeated except that the amount of methyl chloride in the feed was increased to such an extent that molar ratio of methyl chloride to dry hydrogen chloride was 2.16:1 (space velocity=15 liters/hr./kg.), and the following results were obtained.

|  | Percent |
|---|---|
| $HSiCl_3$ | 5.3 |
| $MeSiHCl_2$ | 21.2 |
| $SiCl_4$ | 3.4 |
| $Me_2SiCl_2$ | 32.8 |
| $MeSiCl_3$ | 19.7 |

*Example 5*

This example, showing practice under conditions outside the scope of the invention, is presented for purpose of illustrating results obtained when the catalyst, required in the process of the invention, is contaminated with zinc.

A contact mass was one obtained by mixing that of Example 3 with 0.003 part of zinc powder. The mixture gas of methyl chloride and dry hydrogen chloride (molar ratio=1.46:1) was passed at 280° C. at a rate of 18 liters/hr./kg. to obtain the following results, from which it was observed that the yield of the object monomethyl-dichlorosilane was remarkably decreased comparing with Example 3.

|  | Percent |
|---|---|
| $HSiCl_3$ | 15.6 |
| $MeSiHCl_2$ | 11.8 |
| $SiCl_4$ | 7.0 |
| $Me_2SiCl_2$ | 29.6 |
| $MeSiCl_3$ | 18.3 |

*Example 6*

One part of copper foil powder was immersed in an aqueous solution containing 0.8 part of silver nitrate to produce copper-silver powder (Ag: 37.5%). One part of the thus obtained powder was further mixed with 10 parts of silicon powder in a ball-mill. The product was used as a contact mass. A mixture gas of methyl chloride, dry hydrogen chloride and nitrogen in a molar ratio of 1.6:1:0.4 was passed at a rate of 20 liters/hr./kg. on the contact mass at a temperature of 330° C. to obtain the following composition as condensate.

|  | Percent |
|---|---|
| $HSiCl_3$ | 11.8 |
| $MeSiHCl_2$ | 21.5 |
| $SiCl_4$ | 8.7 |
| $Me_2SiCl_2$ | 18.0 |
| $MeSiCl_3$ | 23.0 |

*Example 7*

Onto a contact mass containing 6% of silver obtained from 1 part of copper foil powder and an aqueous solution containing 0.1 part of silver nitrate according to the same procedures in the preceding examples, a mixture gas of methyl chloride, dry hydrogen chloride and hydrogen in a molar ratio of 1.44:1:0.35 was passed at a rate of 20 liters/hr./kg. at a temperature of 280° to 290° C. to obtain condensate condensation liquid having the following composition:

|  | Percent |
|---|---|
| $HSiCl_3$ | 13.7 |
| $MeSiHCl_2$ | 22.9 |
| $SiCl_4$ | 4.9 |
| $Me_2SiCl_2$ | 19.0 |
| $MeSiCl_3$ | 22.2 |

*Example 8*

Onto a contact mass prepared from 1 part of copper-silver alloy foil powder (silver content: 12.5%) and 9 parts of silicon powder, a mixture gas of methyl chloride and dry hydrogen chloride in a molar ratio of 1.58:1 was passed at a rate of 18 liters/hr./kg. at a temperature of 290° to 300° C. to obtain condensate of the following composition:

|  | Percent |
|---|---|
| $HSiCl_3$ | 8.3 |
| $MeSiHCl_2$ | 31.6 |
| $SiCl_4$ | 4.3 |
| $Me_2SiCl_2$ | 22.3 |
| $MeSiCl_3$ | 20.5 |

*Example 9*

The procedures of the preceding Example 8 were repeated except that the amount of methyl chloride was increased to such an extent that molar ratio of methyl chloride to dry hydrogen chloride was 1.97:1. Space velocity=17 liters/hr./kg. The composition of condensate was obtained as follows:

|  | Percent |
|---|---|
| $HSiCl_3$ | 8.0 |
| $MeSiHCl_2$ | 27.1 |
| $SiCl_4$ | 3.1 |
| $Me_2SiCl_2$ | 29.7 |
| $MeSiCl_3$ | 19.1 |

*Example 10*

Into a contact mass prepared by mixing 1 part of copper-silver alloy foil powder having 5.5% of silver with 10 parts of silicon powder, a mixture gas of methyl chloride and dry hydrogen chloride in a molar ratio of 1.44:1 was passed at a rate of 20 liters/hr./kg. at a temperature of 295° to 300° C. The condensate after reaction had the following composition:

| | Percent |
|---|---|
| $HSiCl_3$ | 13.7 |
| $MeSiHCl_2$ | 23.9 |
| $SiCl_4$ | 4.1 |
| $Me_2SiCl_2$ | 21.4 |
| $MeSiCl_3$ | 20.2 |

*Example 11*

Using the same contact mass as employed in the preceding Example 10 a mixture gas of methyl chloride and dry hydrogen chloride (molar ratio=2.90:1) was passed at a rate of 16 liters/hr./kg. at a temperature of 290° C. to obtain a condensate having the following composition:

| | Percent |
|---|---|
| $HSiCl_3$ | 8.6 |
| $MeSiHCl_2$ | 17.3 |
| $SiCl_4$ | 3.1 |
| $Me_2SiCl_2$ | 39.2 |
| $MeSiCl_3$ | 15.9 |

*Example 12*

Eleven parts of silicon and 1 part of copper-silver alloy (silver centent 7%) were packed in the reaction tube as employed in Example 3, and heated at a temperature of 1000° to 1100° C. in a stream of $H_2$ gas to sinter the contact mass. A gas consisting of methyl chloride and dry hydrogen chloride in a molar ratio of 1.90:1 was passed at a rate of 17 liters/hr./kg. on the said sintered contact mass at a temperature of 280° to 285° C. to obtain condensate having the following composition:

| | Percent |
|---|---|
| $HSiCl_3$ | 12.6 |
| $MeSiHCl_2$ | 21.5 |
| $SiCl_4$ | 3.6 |
| $Me_2SiCl_2$ | 24.7 |
| $MeSiCl_3$ | 19.8 |

*Example 13*

Onto a contact mass consisting of 17 parts of silicon and 1 part of copper-silver alloy (silver content: 5.5%) used in Example 10, a mixture gas having a molar ratio of methyl chloride:hydrogen chloride=2.03:1 was passed at a rate of 16 liters/hr./kg. at a temperature of 300° to 310° C. to obtain condensation liquid having the following composition:

| | Percent |
|---|---|
| $HSiCl_3$ | 11.3 |
| $MeSiHCl_2$ | 20.3 |
| $SiCl_4$ | 5.6 |
| $Me_2SiCl_2$ | 23.8 |
| $MeSiCl_3$ | 21.3 |

*Example 14*

Onto a contact mass consisting of 7 parts of silicon and 1 part of copper-silver alloy (copper content: 12.5%) used in Example 8, a mixture gas having a molar ratio of methyl chloride:hydrogen chloride=1.87:1 was passed at a rate of 20 liters/hr./kg. at a temperature of 285° to 295° C. to obtain condensate having the following composition:

| | Percent |
|---|---|
| $HSiCl_3$ | 8.7 |
| $MeHSiCl_2$ | 25.7 |
| $SiCl_4$ | 4.0 |
| $Me_2SiCl_2$ | 23.8 |
| $MeSiCl_3$ | 20.4 |

*Example 15*

Into a reactor equipped with a mechanical fluidizing agitator, having 10 cm. in diameter and 100 cm. long, 10 kg. of a contact mass prepared from one part of Cu-Ag alloy foil as in Example 8 and 10 parts of silicon powder was packed. 22 kg. of the mixture gas of methylchloride and dry hydrogen chloride in a molar ratio of 2.04:1 was passed through the reactor at a rate of 15–16 liters/hr./kg. at a temperature of 290° to 300° C. for 50 hours.

The gases issuing from the reactor were condensed by cooling the same to −20° C. 23 kg. of condensate was obtained and then fractional distillation of said condensate gave the following analysis.

| | Percent |
|---|---|
| $HSiCl_3$ | 5.8 |
| $MeSiHCl_2$ | 28.9 |
| $SiCl_4$ | 0.5 |
| $Me_2SiCl_2$ | 30.2 |
| $MeSiCl_3$ | 21.7 |

*Example 16*

10 kg. of the same contact mass employed in Example 8 and the same and reactor employed in Example 15 were used. 120 kg. of the mixture gas of methyl chloride and dry hydrogen chloride in a molar ratio of 2.21:1 was passed at a rate of 20–25 liters/hr./kg. at a temperature of 295° to 300° C. The reaction was continuously carried out in total 300 hours, by additionally adding 1.5 kg. of the contact mass of 24 parts of silicon powder and 1 part of copper-silver alloy foil powder at every 20 hours. 120 kg. of condensate obtained had the following composition:

| | Percent |
|---|---|
| $HSiCl_3$ | 4.5 |
| $MeSiHCl_2$ | 38.6 |
| $SiCl_4$ | 1.0 |
| $Me_2SiCl_2$ | 23.5 |
| $MeSiCl_3$ | 21.3 |

What we claim is:

1. A method for preparing monomethyldichlorosilane which comprises contacting a gaseous mixture of methyl chloride and hydrogen chloride in molar ratio of from 3:1 to 0.5:1 with a contact mass consisting of silicon, copper and silver in which the content of silver and copper together amounts to about 5 to 15% by weight of the total contact mass, and wherein the ratio of silver to copper ranges, in parts by weight, from 3:97 to 50:50, at a temperature of 250° to 350° C., and distilling the contact product to recover monomethyldichlorosilane.

2. A method according to claim 1, wherein the contact mass is a mixture consisting of 95 to 85% by weight of silicon and 5 to 15% by weight of copper-silver alloy whose silver content is 3 to 50% by weight of the alloy.

3. A method according to claim 1, wherein the gaseous mixture contains methyl chloride and hydrogen chloride in molar ratio of 2.5:1–1.4:1.

4. A method according to claim 1, wherein the contact mass is a mixture consisting of 95 to 85% by weight of silicon and 5 to 15% by weight of a copper-silver mixture, the copper-silver mixture having 3 to 50% by weight of silver based on the total weight of copper and silver on the surface of copper powder.

5. A method according to claim 1, wherein the contact mass is a ternary alloy consisting of 95 to 85% of silicon, 2.5 to 14.55% of copper and 0.15 to 7.5% of silver.

6. A method according to claim 1, wherein an inert gas is fed together with the gaseous mixture.

References Cited in the file of this patent
UNITED STATES PATENTS

| | | |
|---|---|---|
| 2,307,421 | Overhoff | Jan. 5, 1943 |
| 2,380,995 | Rochow | Aug. 7, 1945 |
| 2,488,487 | Barry et al. | Nov. 15, 1949 |
| 2,771,380 | Coleman et al. | Nov. 20, 1956 |
| 2,902,504 | Nitzsche et al. | Sept. 1, 1959 |
| 2,903,473 | Takami et al. | Sept. 8, 1959 |